US012212103B2

(12) United States Patent
DeWitt

(10) Patent No.: US 12,212,103 B2
(45) Date of Patent: Jan. 28, 2025

(54) ELECTRICAL COAX CONTACT SYSTEM

(71) Applicant: Carlisle Interconnect Technologies, Inc., Kent, WA (US)

(72) Inventor: William James DeWitt, Camarillo, CA (US)

(73) Assignee: CARLISLE INTERCONNECT TECHNOLOGIES, INC., Kent, WA (US)

( * ) Notice: Subject to any disclaimer, the term of this patent is extended or adjusted under 35 U.S.C. 154(b) by 272 days.

(21) Appl. No.: 17/814,376

(22) Filed: Jul. 22, 2022

(65) Prior Publication Data

US 2023/0021775 A1 Jan. 26, 2023

Related U.S. Application Data

(60) Provisional application No. 63/230,578, filed on Aug. 6, 2021, provisional application No. 63/225,445, filed on Jul. 23, 2021.

(51) Int. Cl.

| | |
|---|---|
| ***H01R 24/40*** | (2011.01) |
| ***H01R 13/502*** | (2006.01) |
| ***H01R 13/52*** | (2006.01) |
| ***H01R 103/00*** | (2006.01) |

(52) U.S. Cl.

CPC ......... *H01R 24/40* (2013.01); *H01R 13/5025* (2013.01); *H01R 13/5205* (2013.01); *H01R 13/5221* (2013.01); *H01R 2103/00* (2013.01)

(58) Field of Classification Search

CPC ................ H01R 24/40; H01R 13/5025; H01R 13/5205; H01R 13/5221; H01R 2103/00; H01R 13/533; H01R 13/436

See application file for complete search history.

(56) References Cited

U.S. PATENT DOCUMENTS

| | | | | | |
|---|---|---|---|---|---|
| 1,552,262 | A | 9/1942 | Betz | | |
| 3,184,706 | A * | 5/1965 | Atkins | H01R 9/0521 | 174/89 |
| 4,054,346 | A | 10/1977 | Schultz | | |
| 4,148,541 | A | 4/1979 | Marks | | |
| 5,649,837 | A | 7/1997 | Arnold | | |
| 7,018,226 | B2 | 3/2006 | Milner et al. | | |
| 7,419,398 | B2 | 9/2008 | Goodman | | |
| 7,458,851 | B2 * | 12/2008 | Montena | H01R 9/0521 | 439/584 |
| 8,764,471 | B2 | 7/2014 | Dang | | |

(Continued)

OTHER PUBLICATIONS

International Searching Authority / United States, International Search Report and Written Opinion for Application No. PCT/US2022/074051, mailed Nov. 1, 2022, 11 pages.

*Primary Examiner* — Briggitte R. Hammond

(74) *Attorney, Agent, or Firm* — Stoel Rives LLP

(57) ABSTRACT

An electrical connector including an electrically conductive shell sized to receive and retain an electrically insulating housing insert, where the housing insert includes a cavity for receiving and retaining a wire-terminating electrical contact therein. The shell and housing insert each including keying features designed to cooperate with one another to resist independent rotation of the housing insert within the shell. The electrical connector further includes a wire sealing grommet coupled to the housing insert to improve connector performance and minimize arcing issues.

20 Claims, 7 Drawing Sheets

(56) References Cited

U.S. PATENT DOCUMENTS

| | | | |
|---|---|---|---|
| 8,979,592 | B2 | 8/2015 | Dang |
| 9,306,312 | B2 | 4/2016 | Dang |
| 9,728,902 | B2 | 8/2017 | Höher et al. |
| 11,108,181 | B2 | 8/2021 | Lane |
| 11,114,796 | B2 | 9/2021 | Dewitt |
| 2008/0207051 | A1 | 8/2008 | Montena |
| 2010/0297875 | A1 | 11/2010 | Purdy et al. |
| 2011/0165789 | A1 | 7/2011 | Sykes |
| 2015/0332809 | A1 | 11/2015 | Natoli et al. |
| 2018/0040833 | A1 | 2/2018 | Ahn et al. |
| 2020/0036126 | A1 | 1/2020 | Kobayashi et al. |

* cited by examiner

ELECTRICAL COAX CONTACT SYSTEM

RELATED APPLICATION DATA

This application is a nonprovisional of and claims the benefit under 35 U.S.C. § 119(e) of U.S. Provisional Patent Application No. 63/230,578, filed Aug. 6, 2021 and entitled "ELECTRICAL COAX CONTACT," and is a nonprovisional of and claims the benefit under 35 U.S.C. § 119(e) of U.S. Provisional Patent Application No. 63/225,445, filed Jul. 23, 2021 and entitled "ELECTRICAL COAX CONTACT," the disclosures of which are incorporated by reference herein in their entireties.

BACKGROUND

The field of this disclosure relates generally to electrical connectors and, in particular, to an electrical coax contact system designed for improved performance in high-power applications.

Electrical connectors are commonly used to connect electronic devices for facilitating communication and information transfer. Electrical connectors may be used in a variety of applications, such as for high-speed data transmission, for handling large electrical loads in high-power applications, or in other suitable settings. These connectors are typically subjected to a variety of harsh environmental conditions. For example, electrical connectors may experience large vibration and mechanical shock, extreme moisture, high external electrical and magnetic interference, and temperature and pressure changes, each of which can detrimentally affect overall performance. While the connectors may not typically experience all these conditions at once, high-power electrical connectors commonly operate in these environmental conditions and should be designed to handle any of these variables to maintain optimal performance across a range of potential applications.

Because degraded performance of an electrical connector adversely impacts the ability of a system to transfer energy, the present inventor has recognized a need for a robust and improved electrical coax contact system design capable of operating within these environmental conditions while maintaining peak performance in demanding industries, such as aerospace systems, aircraft electronic systems, and other similar high-power applications. Additional aspects and advantages will be apparent from the following detailed description of preferred embodiments, which proceeds with reference to the accompanying drawings.

DETAILED DESCRIPTION OF EXAMPLE EMBODIMENTS

Figure 1:
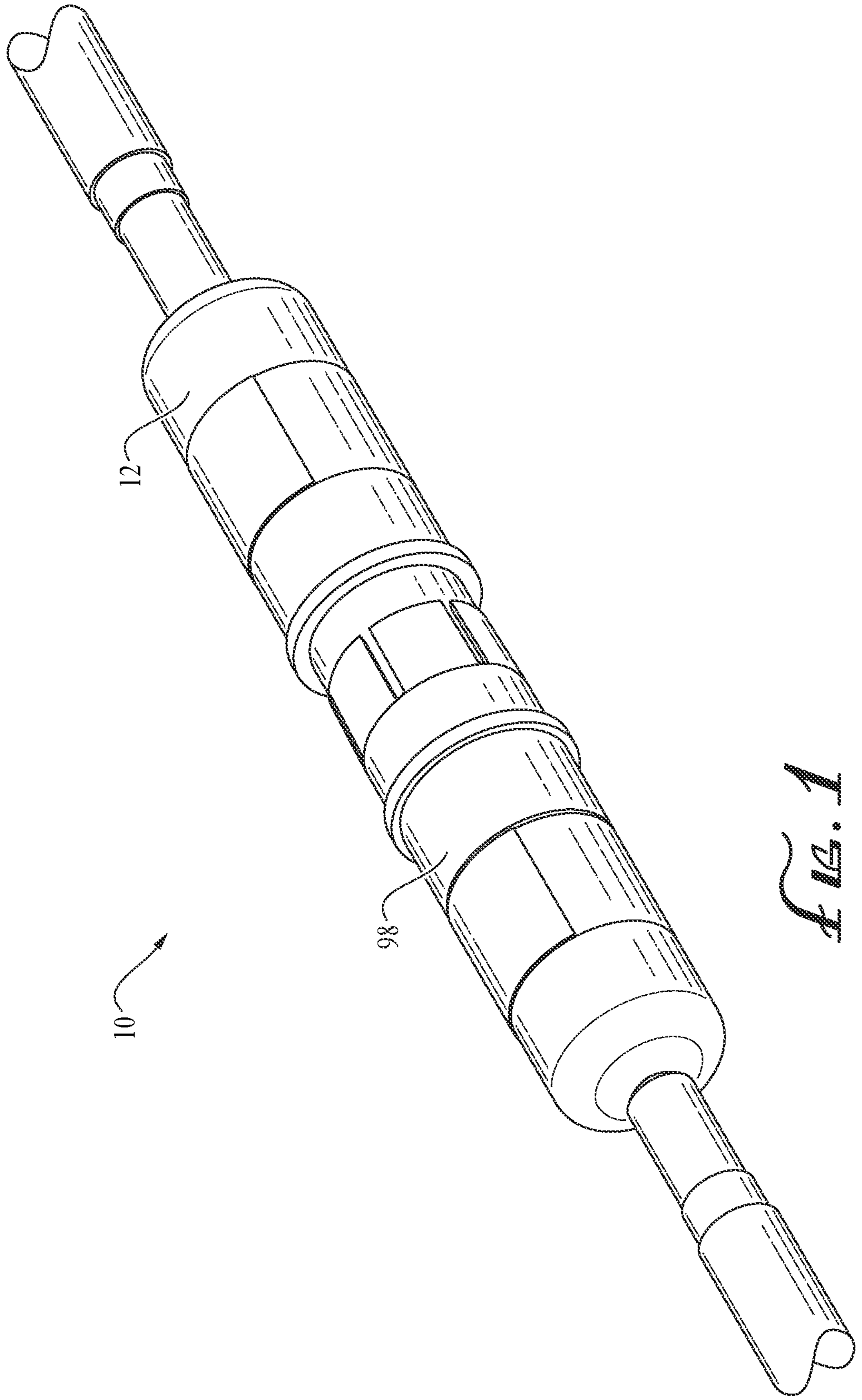
FIG. 1 is a perspective view of an electrical connector system including a pair of mated connectors in accordance with one embodiment.

With reference to the drawings, this section describes various embodiments of an improved electrical connector system, or more specifically, an electrical coax contact system, and its detailed construction and operation. Throughout the specification, reference to "one embodiment," "an embodiment," or "some embodiments" means that a particular described feature, structure, or characteristic may be included in at least one embodiment of an electrical coax contact system. Thus, appearances of the phrases "in one embodiment," "in an embodiment," or "in some embodiments" in various places throughout this specification are not necessarily all referring to the same embodiment. Furthermore, the described features, structures, and characteristics may be combined in any suitable manner in one or more embodiments. In view of the disclosure herein, those skilled in the art will recognize that the various embodiments can be practiced without one or more of the specific details or with other methods, components, materials, or the like.

For reference, the following disclosure describes example embodiments of an electrical connector system that may be used for high-power applications, where the electrical connector system is capable of delivering power of 30 amps or more, which may be useful in the aerospace industry and other related applications, such as aircraft electronic systems. In the following description, certain components of the electrical connector system are described in detail, while in some instances, well-known structures, materials, or operations are not shown or not described in detail to avoid obscuring more pertinent aspects of the embodiments. It should be understood that one having ordinary skill in the art understands how to incorporate the features of the electrical connector design described below into a functional electrical connector, even though certain aspects of the electrical connectors are not further described herein.

With general reference to the figures, the following description relates to an electrical connector system having a hybrid power coax pin and socket contact design suitable for high-power applications, where the overall components of the electrical connector system are designed to maintain optimal performance under harsh environmental conditions. As further described in detail below, the socket contact includes a plurality of cantilevered fingers or flanges designed to create multiple contact surfaces between the pin and socket contacts for aiding in aligning the contacts during the mating process, and for minimizing lateral and rotational movement of the contacts after assembly to maintain optimal performance. In addition, the electrical connector system further includes a wire sealing grommet designed to provide a properly sealed environment for the wires of the electrical connector, where the sealing grommet is coupled to a contact housing insert to minimize arcing issues for the electrical connector system.

In some embodiments, the electrical connector system is designed to operate under some or all of the following conditions: Ambient Temperature: 70° C., Internal Heating: 30° C., Resultant Temperature: 100° C., and an Operational Altitude of 51000 ft. The electrical connector is also designed to handle instantaneous peak transient voltage, including under fault conditions. These voltages are: Conductor: 0-540 V; Screen: 0-360 V. In addition, the electrical connector is also designed to handle sustained peak voltages, including under sustained fault conditions. These voltages are: Conductor: 0-320 V; Screen: 0-213 V. In some embodiments, the coax contacts may have rated current and voltage values of 30 A-100 A and 270 V or higher. Additional details, advantages, and features of the electrical connector design are provided below with particular reference to the figures.

FIG. 1 illustrates an electrical connector system 10 including a pair of mated electrical connectors 12, 98 in accordance with one embodiment. With reference to FIG. 1, the electrical connector system 10 includes a pin connector 12 that interfaces and mates with a socket connector 98 to create an electrical connection between the wires 68, 162 (see FIGS. 4 and 7) of the respective connectors 12, 98. As described in further detail below, each connector 12, 98 includes wires covered with appropriate insulating material and terminated at one end by a contact (e.g., a pin contact 60 or a socket contact 150). In some embodiments, the connector system 10 may be designed and arranged to accommodate size 10 contacts 60, 150. While the example embodiments described herein are described with reference to size 10 contacts, it should be understood that this particular size and configuration for the electrical connector system 10 is for illustration purposes. In other embodiments, the contact size may be adjusted without departing from the principles of the claimed subject matter as further described below.

With general reference to FIGS. 2-7, the following description focuses on the design and arrangement of the pin connector 12 and the socket connector 98 of the electrical connector system 10 to achieve a connector design capable of handling high-power applications of 30 amps or more, while maintaining appropriate shielding, mechanical shock and vibration resistance, and performance in extreme temperature and pressure changes. The following section provides additional details relating specifically to the features of the pin connector 12 and the socket connector 98. The discussion begins with details relating first to the pin connector 12 with reference to FIG. 2-4, followed by a description of the socket connector 98 with reference to FIGS. 5-7, and concludes with a discussion focusing on how the respective components interact with one another when the connectors 12, 98 are mated.

Figure 2:
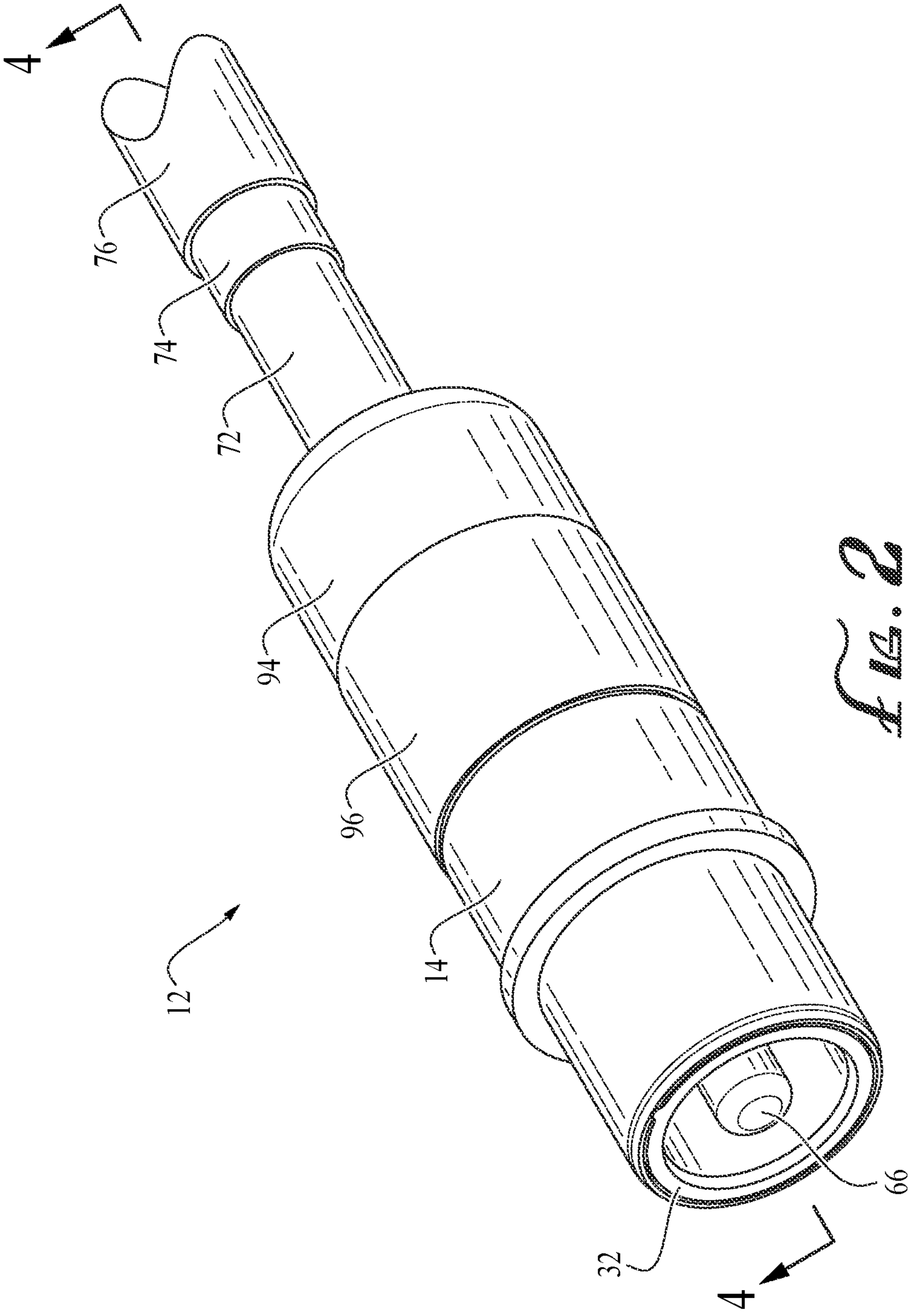
FIG. 2 is a perspective view of a pin connector of the electrical connector system of FIG. 1 in accordance with one embodiment.
Figure 3:
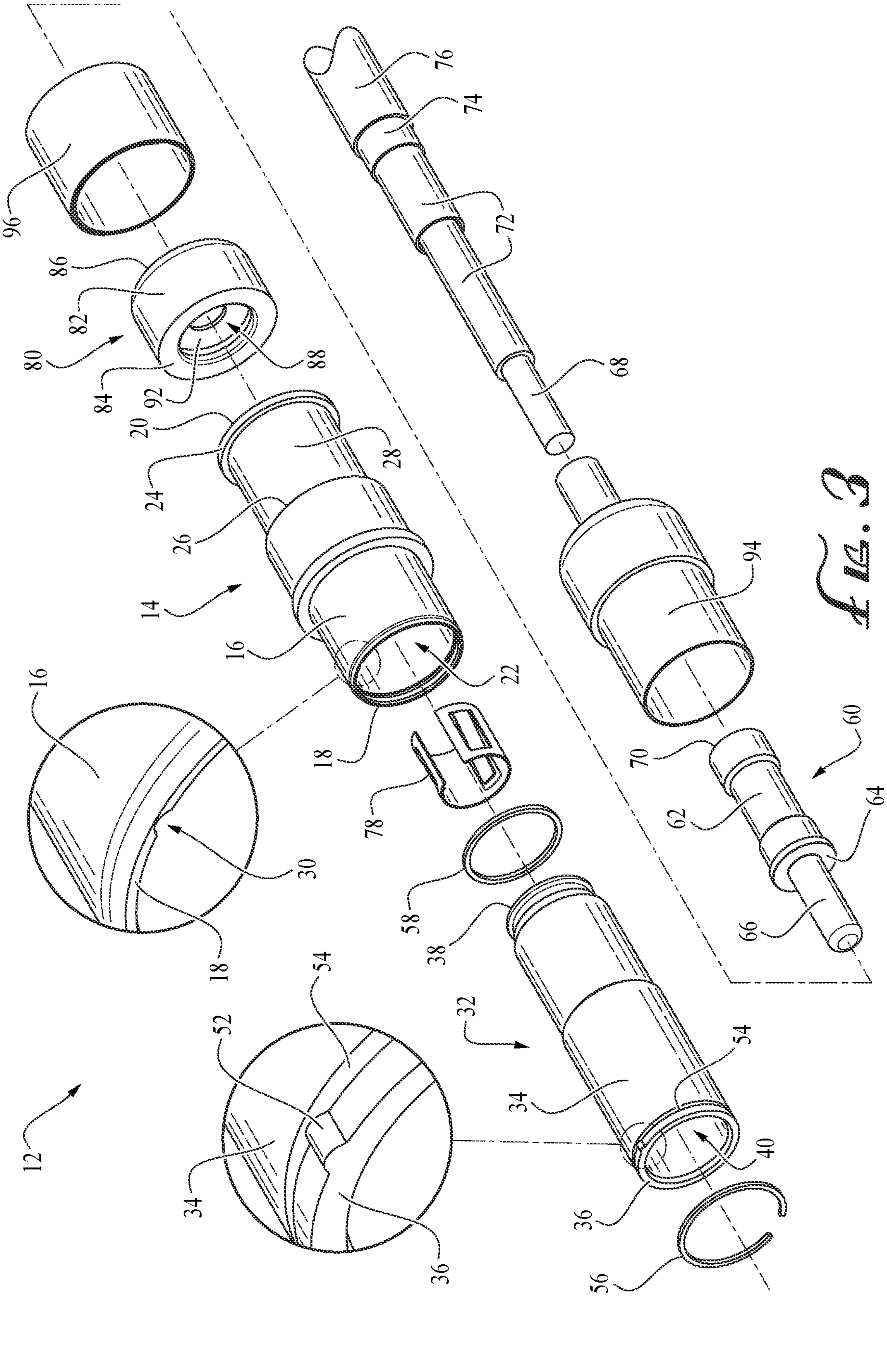
FIGS. 3 and 4 illustrate an exploded view and a cross-section view, respectively, of the pin connector of FIG. 2.
Figure 4:
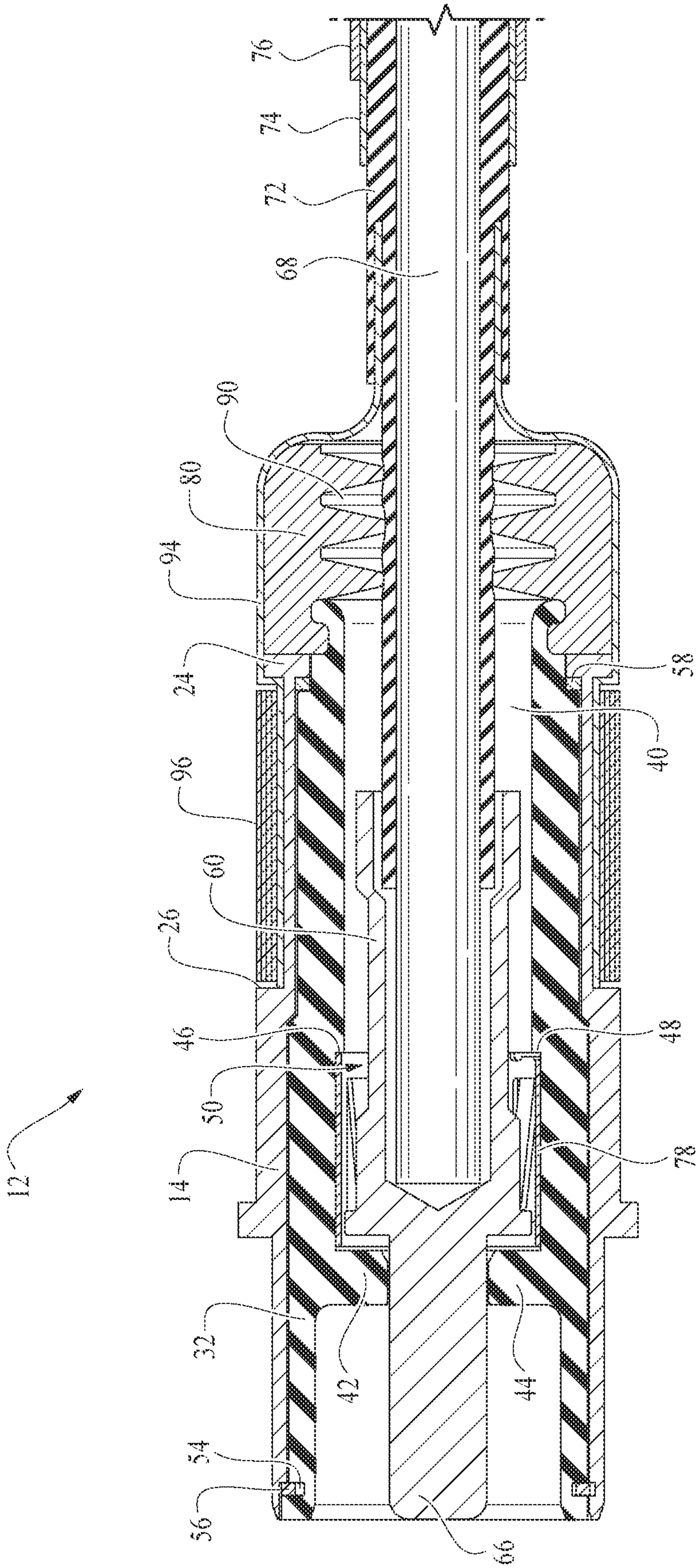

FIGS. 2-4 collectively illustrate a hybrid power coax pin connector 12 of the electrical connector system 10. With general reference to FIG. 3, the pin connector 12 includes a shell 14 having a generally tubular body 16, the body 16 including a front end 18, a rear end 20, and a cavity 22 extending along an axial direction through the body 16 from the front end 18 to the rear end 20. The body 16 is described herein as being generally tubular, but it should be understood that the body 16 may have other shapes and configurations in other embodiments. The body 16 includes a first lip 24 formed adjacent the rear end 20 and a second lip 26 offset from the first lip 24, where the lips 24, 26 form the boundaries of a recessed seat 28 defined therebetween, the seat 28 spanning around a circumference of an exterior surface of the body 16. The shell 14 further includes a first key feature 30 formed as a slot or cutaway region along an interior surface of the body 16 adjacent the front end 18, the first key feature 30 facing inwardly toward the cavity 22. The shell 14 may be formed as a unitary structural member from any suitable material having high electrical conductivity, or formed from a material coated with such a highly conductive material, for improved performance of the electrical connector system 10. For example, in some embodiments, the shell 14 may be formed of a gold-plated brass material.

With reference to FIG. 3, the pin connector 12 further includes a housing insert 32 having a generally tubular body 34, the body 34 including a front end 36, a rear end 38, and a contact-receiving cavity 40 extending along an axial direction through the body 34 from the front end 36 to the rear end 38. Again, the body 34 is described herein as being generally tubular, but it should be understood that the body 34 may have other shapes and configurations in other embodiments, where the shape of the body 34 of the housing insert 32 corresponds to the shape of the body 16 of the shell 14. The housing insert 32 may be formed from any suitable material with desirable electrical insulation and heat resistant properties for improved performance of the electrical connector system 10. For example, in some embodiments, the housing insert 32 may be formed of a ceramic material. In other embodiments, the housing insert 32 may be made from a thermoset plastic material (such as diallyl phthalate), or a thermoplastic material (such as polyether ether ketone, polyetherimide, or polybutylene terephthalate), or other suitable insulator material.

With reference to FIG. 4, within the contact-receiving cavity 40, the housing insert 32 includes an upper shoulder 42 and a lower shoulder 44 that collectively form a seat for receiving and supporting a pin contact 60 as further described below. As illustrated in FIG. 4, the housing insert 32 includes an opening (obscured from view in FIG. 4) between the shoulders 42, 44 through which a head 66 of the pin contact 60 extends. The shoulders 42, 44 along with rear walls 46, 48 together form a pocket 50 within the housing insert 32 for receiving a contact-retaining clip 78 when the pin contact 60 is seated within housing insert 32 as further explained in detail below.

Returning to FIG. 3, the housing insert 32 includes a second key feature 52 formed as a ridge or bump along the front end 36 thereof, the second key feature 52 designed to sit against and mate with the first key feature 30 formed within the body 16 of the shell 14. When in a mated configuration, the second key feature 52 and first key feature 30 cooperate to retain the housing insert 32 in proper alignment and resist independent rotation of the housing insert 32 to keep it from freely rotating within the shell 14 when the pin connector 12 is assembled. It should be understood that while the figures illustrate the key feature 52 as a ridge or bump on the housing insert 32 and the key feature 30 as a corresponding slot on the shell 14, the arrangement of these features could be swapped in other embodiments. For example, the ridge or bump could instead be formed on the shell 14 and the corresponding slot could be formed on the housing insert 32.

Adjacent the key feature 52, the housing insert 32 includes a channel 54 formed on the body 34, the channel 54 extending around the circumference of the body 34. The channel 54 is formed behind a position of the key feature 52 relative to the front end 36 of the housing insert 32 as illustrated in FIG. 3. When the housing insert 32 is coupled with the shell 14, a retaining ring 56 collapses into the channel 54 on the housing insert 32 to retain the housing insert 32 in position within the shell 14 and resist separation of the two components. The housing insert 32 further includes a rubber spring 58 (or other suitable seal) encircling the body 34 adjacent the rear end 38. With reference to FIG. 4, the rubber spring 58 abuts against an interior surface of the shell 14 to help address any tolerance issues and ensure a tight fit between the housing insert 32 and the shell 14. In an assembled configuration, the rubber spring 58 applies a force against the retaining ring 56 at assembly to ensure the housing insert 32 and shell 14 remain firmly mated.

The pin connector 12 further includes a pin contact 60 made of any suitable conductive metal or metal alloy such as copper, aluminum, or nickel (or nickel-plated material) designed to carry high current. With reference to FIGS. 3 and 4, the pin contact 60 includes a body 62 with a collar 64 and a head 66 extending from the collar 64 toward a front portion of the pin contact 60. The pin contact 60 terminates a size 10 (or other suitable size) wire 68 received through an opening (obscured from view) formed on a rear end 70 of the pin contact 60. The wire 68 includes one or more insulation layers 72, a shield 74, and an outer jacket 76 encircling the wire 68 to insulate and protect the wire 68 from the environment during use. It should be noted that the insulation layers 72, shield 74, and outer jacket 76 are shown as only partially surrounding one another in the figures for ease of illustration of the various components. In an assembled configuration, the shield 74 entirely surrounds the insulation layers 72, and the outer jacket 76 entirely surrounds the shield 74.

With particular reference to FIG. 4, the following describes an example assembly of the pin contact 60 and the housing insert 32. In an assembled configuration, the pin contact 60 and the size 10 wire 68 are arranged within the contact-receiving cavity 40 of the housing insert 32, with the collar 64 of the pin contact 60 positioned adjacent the shoulders 42, 44, and the head 66 extending through the opening between the shoulders 42, 44 and toward the front end 36 of the housing insert 32 to form the mating interface of the pin connector 12. The pin connector 12 further includes a contact-retaining clip 78 encircling a portion of the pin contact 60, the contact-retaining clip 78 seated within the pocket 50 formed within the housing insert 32. With the contact-retaining clip 78 in the pocket 50, the contact-retaining clip 78 abuts the shoulders 42, 44 and the walls 46, 48 of the pocket 50 to ensure the contact 60 is securely retained in position within the housing insert 32.

With reference to FIGS. 3-4, the pin connector 12 includes a wire sealing grommet 80 having a body 82, the body 82 including a front end 84, a rear end 86, and a cavity 88 extending along an axial direction through the body 82 from the front end 84 to the rear end 86. The wire sealing grommet 80 may be made from any suitable material, such as silicone or rubber. Within the cavity 88, the wire sealing grommet 80 includes a plurality of ripple features 90 (see FIG. 4) designed to create a tight seal around the size 10 wire 68 to protect against the intrusion of dust, debris, and moisture. The front end 84 of the body 82 may include a recessed region 92 with a diameter and mating features corresponding to those of the rear end 38 of the housing insert 32. With particular reference to FIG. 4, the rear end 38 of the housing insert 32 is received within the recessed region 92 of the wire sealing grommet 80, with the two components bonded to one another to seal the pin contact 60 and the wire 68. In some embodiments, the rear end 38 of the housing insert 32 and the recessed region 92 of the wire sealing grommet 80 may include threading or other mating features to help ensure a tight fit and seal between the components. Coupling the wire sealing grommet 80 directly with the housing insert 32 instead of the shell 14 optimizes the dielectric potential of the shielding components of the pin connector 12 and helps avoid arcing between the shell 14 and the shielding components. As illustrated in FIG. 4, with the components mated, the wire 68 extends through the contact-receiving cavity 40 of the housing insert 32, through the front end 84 and the ripple features 90 within the cavity 88 of the wire sealing grommet 80, and exiting out the rear end 86 of the wire sealing grommet 80.

The pin connector 12 further includes a second shield 94 encircling the wire sealing grommet 80 and a portion of the shell 14 to help further insulate the pin connector 12. With reference to FIGS. 3 and 4, a portion of the second shield 94 extends over the rear end 20 and the lip 24 of the shell 14 and is disposed along the seat 28 formed between the lips 24, 26 of the shell 14. A shield banding strap 96 is positioned around the seat 28, the shield banding strap 96 encircling the portion of the second shield 94 disposed along the seat 28 to retain the second shield 94 in place against the body 16 of the shell 14.

Figure 5:
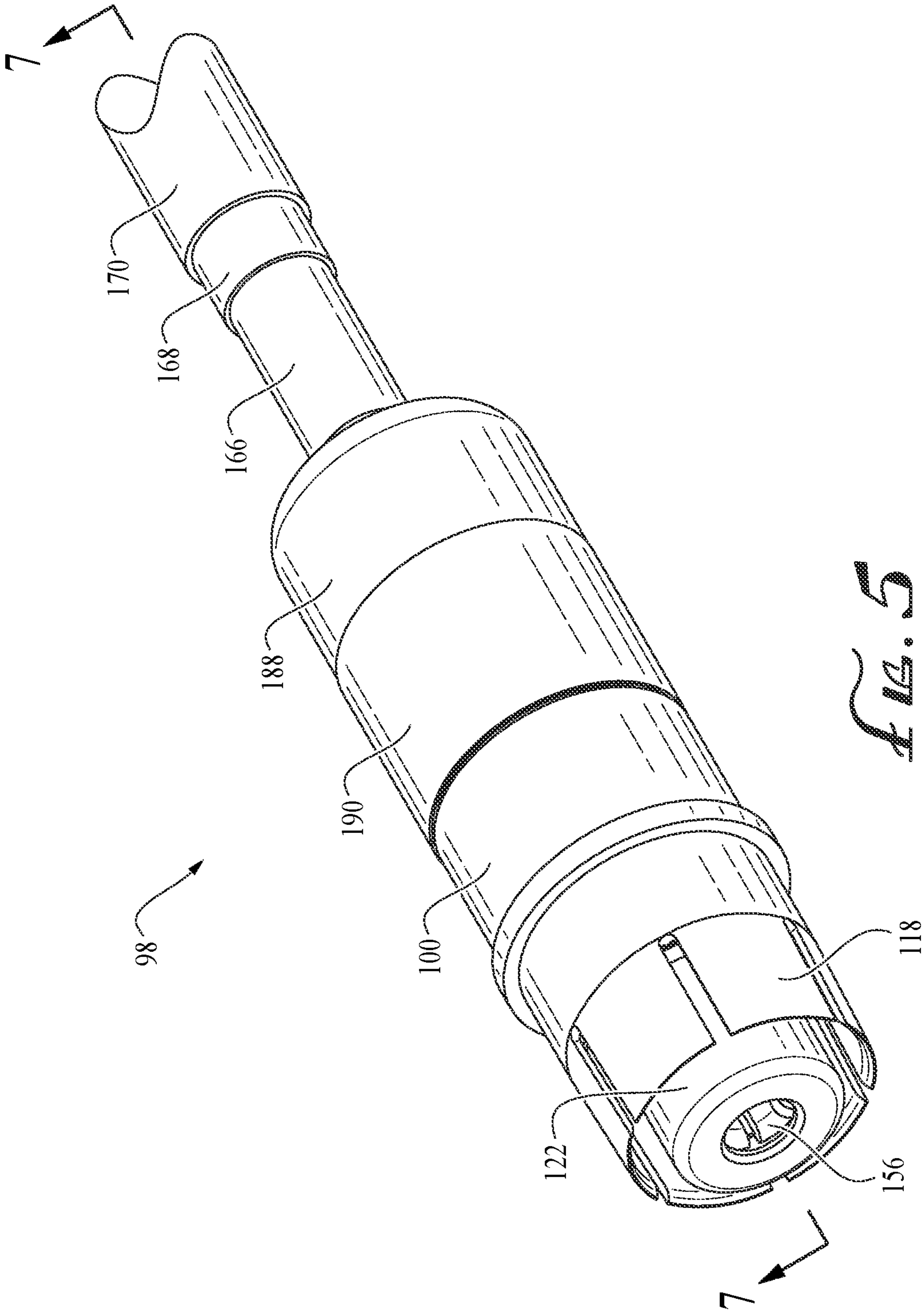
FIG. 5 is a perspective view of a socket connector of the electrical connector system of FIG. 1 in accordance with one embodiment.
Figure 6:
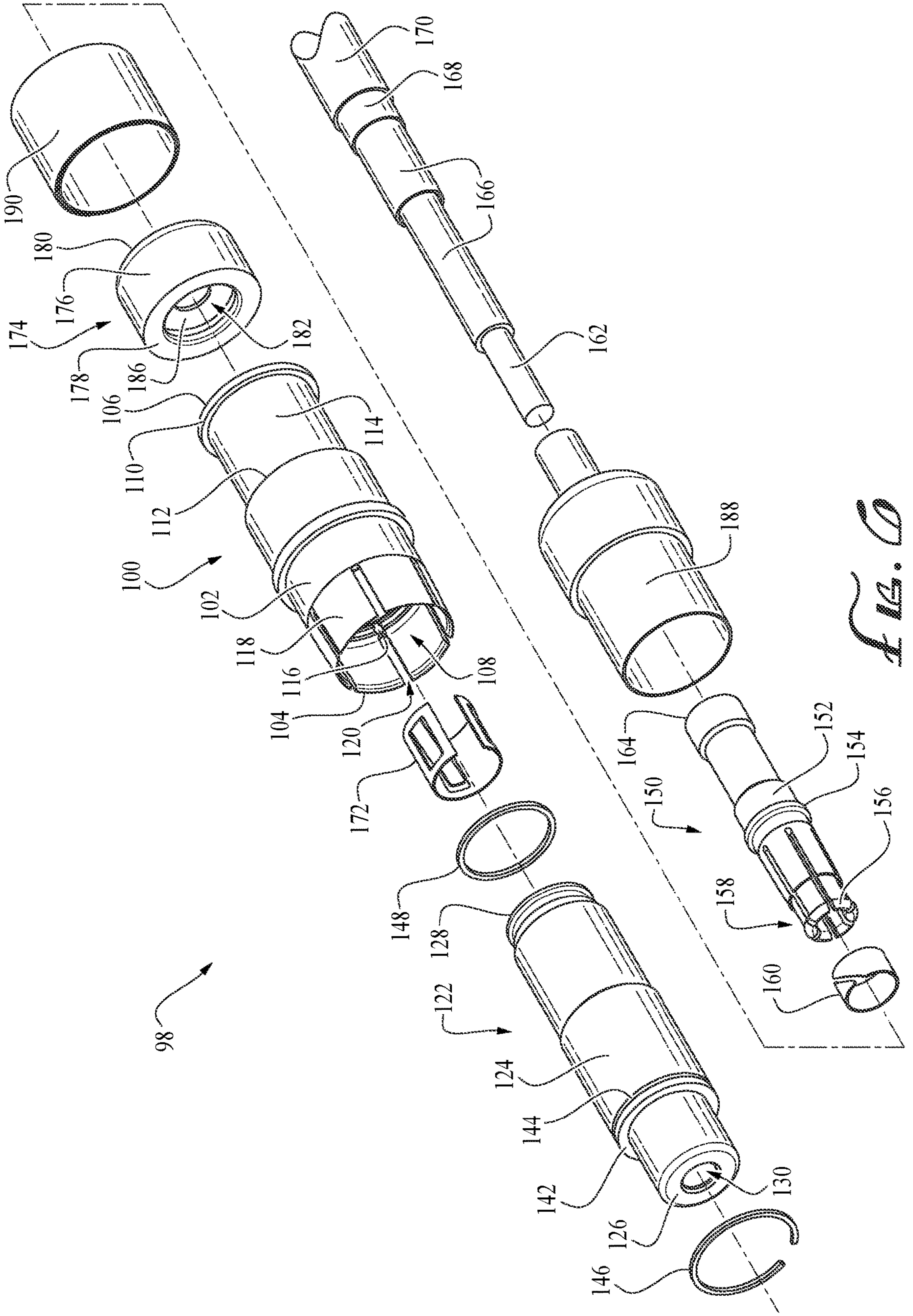
FIGS. 6 and 7 illustrate an exploded view and a cross-section view, respectively, of the socket connector of FIG. 5.
Figure 7:
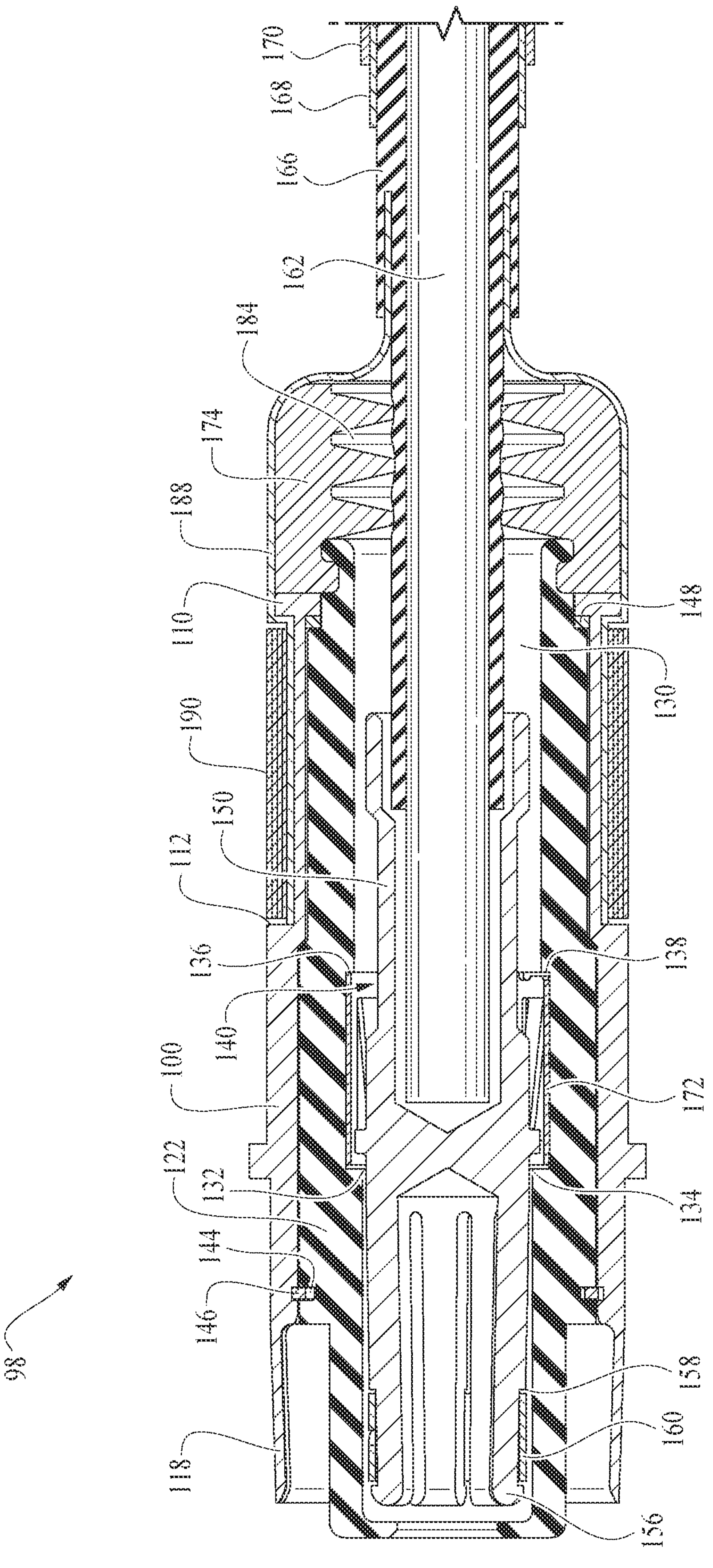

FIGS. 5-7 collectively illustrate a hybrid power coax socket connector 98 of the electrical connector system 10. For reference purposes, the socket connector 98 includes many of the same components arranged in the same manner as the pin connector 12 described with reference to FIGS. 2-4. With general reference to FIG. 6, the socket connector 98 includes a shell 100 having a generally tubular body 102, the body 102 including a front end 104, a rear end 106, and a cavity 108 extending along an axial direction through the body 102 from the front end 104 to the rear end 106. The body 102 is described herein as being generally tubular, but it should be understood that the body 102 may have other shapes and configurations in other embodiments. The body 102 includes a first lip 110 formed adjacent the rear end 106 and a second lip 112 offset from the first lip 110, where the lips 110, 112 form the boundaries of a recessed seat 114 defined therebetween, the seat 114 spanning around a circumference of an exterior surface of the body 102. The shell 100 further includes a first key feature 116 formed as a slot or cutaway region along an interior surface of the body 102 adjacent the front end 104, the first key feature 116 facing inwardly toward the cavity 108.

Along the front end 104 of the body 102, the shell 100 further includes a plurality of cantilevered fingers 118 arranged generally parallel relative to a central longitudinal axis extending through the cavity 108 of the shell 100. The fingers 118 are formed as integral components of the body 102, the fingers 118 having a free end along the front end 104 of the body 102. The cantilevered fingers 118 are separated from one another via a small gap or slot 120 that is preferably of equal size between all the fingers 118 to ensure that the fingers 118 are distributed evenly along the body 102 of the shell 100. The shell 100 may be formed as a unitary structural member from any suitable material having high electrical conductivity, or formed from a material coated with such a highly conductive material, for improved performance of the electrical connector system 10. For example, in some embodiments, the shell 100 may be formed of a gold-plated brass material.

With reference to FIG. 6, the socket connector 98 further includes a housing insert 122 having a generally tubular body 124, the body 124 including a front end 126, a rear end 128, and a contact-receiving cavity 130 extending along an axial direction through the body 124 from the front end 126 to the rear end 128. Again, the body 124 is described herein as being generally tubular, but it should be understood that the body 124 may have other shapes and configurations in other embodiments, where the shape of the body 124 of the housing insert 122 corresponds to the shape of the body 102 of the shell 100. The housing insert 122 may be formed from any suitable material with desirable electrical insulation and heat resistant properties for improved performance of the electrical connector system 10. For example, in some embodiments, the housing insert 122 may be formed of a ceramic material. In other embodiments, the housing insert 122 may be made from a thermoset plastic material (such as diallyl phthalate), or a thermoplastic material (such as polyether ether ketone, polyetherimide, or polybutylene terephthalate), or other suitable insulator material.

With reference to FIG. 7, within the contact-receiving cavity 130, the housing insert 122 includes an upper shoulder 132 and a lower shoulder 134 that collectively form a seat for receiving and supporting a socket contact 150 as further described below. As illustrated in FIG. 7, the housing insert 122 includes an opening (obscured from view in FIG. 7) between the shoulders 132, 134 through which a plurality of fingers 156 of the socket contact 150 extend. The shoulders 132, 134 along with rear walls 136, 138 together form a pocket 140 within the housing insert 122 for receiving a contact-retaining clip 172 when the socket contact 150 is seated within housing insert 122 as further explained in detail below.

Returning to FIG. 6, the housing insert 122 includes a second key feature (obscured from view, but similar to key feature 52 of the pin connector 12 shown in FIG. 3) formed as a ridge or bump along a collar 142 adjacent the front end 126 thereof, the second key feature designed to sit against and mate with the first key feature 116 formed within the body 102 of the shell 100. When in a mated configuration, the first key feature 116 and second key feature cooperate to retain the housing insert 122 in proper alignment and resist independent rotation of the housing insert 122 to keep it from freely rotating within the shell 100 when the socket connector 98 is assembled. It should be understood that while the second key feature is described as a ridge or bump on the housing insert 122 and the key feature 116 as a corresponding slot on the shell 100, the arrangement of these features could be swapped in other embodiments. For example, the ridge or bump could instead be formed on the shell 100 and the corresponding slot could be formed on the housing insert 122.

Adjacent the collar 142, the housing insert 122 includes a channel 144 formed on the body 124, the channel 144 extending around the circumference of the body 124. The channel 144 is formed behind a position of the collar 142 relative to the front end 126 of the housing insert 122 as illustrated in FIG. 6. When the housing insert 122 is coupled with the shell 100, a retaining ring 146 collapses into the channel 144 on the housing insert 122 to retain the housing insert 122 in position within the shell 100 and resist separation of the two components. The housing insert 122 further includes a rubber spring 148 (or other suitable seal) encircling the body 124 adjacent the rear end 128. With reference to FIG. 7, the rubber spring 148 abuts against an interior surface of the shell 100 to help address any tolerance issues and ensure a tight fit between the housing insert 122 and the shell 100. In an assembled configuration, the rubber spring 148 applies a force against the retaining ring 146 at assembly to ensure the housing insert 122 and shell 100 remain firmly mated.

The socket connector 12 further includes a socket contact 150 made of any suitable conductive metal or metal alloy such as copper, aluminum, or nickel (or nickel-plated material) designed to carry high current. With reference to FIGS. 6 and 7, the socket contact 150 includes a body 152 with a collar 154 and a plurality of cantilevered fingers 156 extending from the collar 154 toward a front portion of the socket contact 150, the fingers 156 being arranged generally parallel relative to a central longitudinal axis traversing the body 152 of the socket contact 150. As mentioned above, the socket contact 150 is formed of a material with high conductivity, but many such materials lack suitable elastic properties to allow the cantilevered fingers 156 to have desired spring force properties when mating with the pin contact 60 as further described below. Accordingly, along an exterior surface of each of the cantilevered fingers 156 is formed a slot 158 sized and dimensioned for receiving a napkin ring 160 encircling the cantilevered fingers 156, where the napkin ring 160 provides the necessary spring force to ensure a secure connection between the pin contact 60 and socket contact 150.

The socket contact 150 terminates a size 10 (or other suitable size) wire 162 received through an opening (obscured from view) formed on a rear end 164 of the socket contact 150. The wire 162 includes one or more insulation layers 166, a shield 168, and an outer jacket 170 encircling the wire 162 to insulate and protect the wire 162 from the environment during use. It should be noted that the insulation layers 166, shield 168, and outer jacket 170 are shown as only partially surrounding one another in the figures for ease of illustration of the various components. In an assembled configuration, the shield 168 entirely surrounds the insulation layers 166 and the outer jacket 170 entirely surrounds the shield 168.

With particular reference to FIG. 7, the following describes an example assembly of the socket contact 150 and the housing insert 122. In an assembled configuration, the socket contact 150 and the size 10 wire 162 are arranged within the contact-receiving cavity 130 of the housing insert 122, with the collar 154 of the socket contact 150 positioned adjacent the shoulders 132, 134, and the fingers 156 extending through the opening between the shoulders 132, 134 and toward the front end 126 of the housing insert 122 to form the mating interface of the socket connector 98. The socket connector 98 further includes a contact-retaining clip 172 encircling a portion of the socket contact 150, the contact-retaining clip 172 seated within the pocket 140 formed within the housing insert 122. With the contact-retaining clip 172 in the pocket 140, the contact-retaining clip 172 abuts the shoulders 132, 134 and the walls 136, 138 of the pocket 140 to ensure the contact 150 is securely retained in position within the housing insert 122.

With reference to FIGS. 6-7, the socket connector 98 includes a wire sealing grommet 174 having a body 176, the body 176 including a front end 178, a rear end 180, and a cavity 182 extending along an axial direction through the body 176 from the front end 178 to the rear end 180. The wire sealing grommet 174 may be made from any suitable material, such as silicone or rubber. Within the cavity 182, the wire sealing grommet 174 includes a plurality of ripple features 184 designed to create a tight seal around the size 10 wire 162 to protect against the intrusion of dust, debris, and moisture. The front end 178 of the body 176 may include a recessed region 186 with a diameter and mating features corresponding to those of the rear end 128 of the housing insert 122. With particular reference to FIG. 7, the rear end 128 of the housing insert 122 is received within the recessed region 186 of the wire sealing grommet 174, with the two components bonded to one another to seal the socket contact 150 and the wire 162. In some embodiments, the rear end 128 of the housing insert 122 and the recessed region 186 of the wire sealing grommet 174 may include threading or other mating features to help ensure a tight fit and seal between the components. Coupling the wire sealing grommet 174 directly with the housing insert 122 instead of to the shell 100 optimizes the dielectric potential of the shielding components of the socket connector 98 and helps avoid arcing between the shell 100 and the shielding components. As illustrated in FIG. 7, with the components mated, the wire 162 extends through the contact-receiving cavity 130 of the housing insert 122, through the front end 178 and the ripple features 184 within the cavity 182 of the wire sealing grommet 174, and exiting out the rear end 180 of the wire sealing grommet 174.

The socket connector 98 further includes a second shield 188 encircling the wire sealing grommet 174 and a portion of the shell 100 to help further insulate the socket connector 98. With reference to FIGS. 6 and 7, a portion of the second shield 188 extends over the rear end 106 and the lip 110 of the shell 100 and is disposed along the seat 114 formed between the lips 110, 112 of the shell 100. A shield banding strap 190 is positioned around the seat 114, the shield banding strap 190 encircling the portion of the second shield 188 disposed along the seat 114 to retain the second shield 188 in place against the body 102 of the shell 100.

With collective reference to FIGS. 1-7, the following briefly describes a mated configuration of the electrical connector system 10 including the pin connector 12 and the socket connector 98. In an example mating process, the pin connector 12 and the socket connector 98 are arranged such that front end 18 of the shell 14 of the pin connector 12 faces the corresponding front end 104 of the shell 100 of the socket connector 98. In this arrangement, the connectors 12, 98 are brought together until the head 66 of the pin contact 60 is received within the opening between the plurality of cantilevered fingers 156 of the socket contact 150. As the connectors 12, 98 are pushed together, the head 66 spreads the plurality of cantilevered fingers 156 apart slightly, with the napkin ring 160 providing sufficient spring force to ensure that the plurality of cantilevered fingers 156 of the socket contact 150 remain tightly wrap around the head 66 of the pin contact 60 to ensure optimal performance of the electrical connector system 10.

Although the description above contains certain details, these details should not be construed as limiting the scope of the invention, but as merely providing illustrations of some embodiments of the invention. It should be understood that subject matter disclosed in one portion herein can be combined with the subject matter of one or more of other portions herein as long as such combinations are not mutually exclusive or inoperable. The terms and descriptions used above are set forth by way of illustration only and are not meant as limitations. It will be obvious to those having skill in the art that many changes may be made to the details of the above-described embodiments without departing from the underlying principles of the invention. Those having skill in the art should understand that other embodiments than those described herein are possible.

The invention claimed is:

1. An electrical connector comprising:

an electrically conductive shell including a body, the body having a front end and an opposite rear end, and a cavity extending along an axial direction through the body from the front end to the rear end;

an electrically insulating housing insert including a body, the body having a front end and an opposite rear end and a contact-receiving cavity extending along an axial direction through the body from the front end to the rear end, the housing insert disposed within the cavity of the electrically conductive shell;

a wire-terminating electrical contact housed within the contact-receiving cavity of the housing insert, the electrical contact having a mating interface disposed along the front end of the housing insert, wherein a wire terminated by the electrical contact extends through the contact-receiving cavity and out the rear end of the housing insert; and a wire sealing grommet including a body, the body having a front end and an opposite rear end, and a cavity extending along an axial direction through the body from the front end to the rear end, the wire sealing grommet including a plurality of ripple features formed within the cavity thereof, wherein the front end of the wire sealing grommet is coupled to the rear end of the housing insert, the wire terminated by the electrical contact extending through the cavity where the plurality of ripple features form a seal around the wire.

2. The electrical connector of claim 1, wherein the body of the shell includes a first key feature formed thereon, and wherein the body of the housing insert includes a second key feature formed thereon, the first and second key features engaging one another to resist independent rotation of the housing insert relative to the shell.

3. The electrical connector of claim 1, wherein the housing insert further includes a channel formed along an exterior surface thereof, the electrical connector further comprising a retaining ring positioned within the channel, the retaining ring resisting separation of the housing insert from the shell.

4. The electrical connector of claim 3, further comprising a spring encircling the housing insert, the spring abutting against an interior surface of the shell and applying a spring force against the housing insert to drive the retaining ring into the channel and maintain the housing insert and shell in a locked configuration.

5. The electrical connector of claim 1, the shell further including a first lip formed on the body adjacent the rear end and a second lip formed on the body and offset from the first lip, the body including a seat formed between the first and second lips, the electrical connector further comprising a shield extending over the wire sealing grommet and onto the seat on the shell.

6. The electrical connector of claim 5, further comprising a shield banding strap encircling the shield and the seat on the shell.

7. The electrical connector of claim 1, wherein the electrical contact is a pin contact including a body with a collar and a head extending from the collar, the housing insert further including a first shoulder and a second shoulder with an opening formed between the first and second shoulders, and wherein the head extends through the opening between the first and second shoulders and toward the front end of the housing insert.

8. The electrical connector of claim 7, the housing insert further including a pocket formed within the contact-receiving cavity between the first and second shoulders and a first wall and a second wall, the electrical connector further including a contact-retaining clip encircling the pin contact, wherein the contact-retaining clip is seated within the pocket to retain the pin contact within the housing insert.

9. The electrical connector of claim 1, wherein the electrical contact is a socket contact including a body with a collar and a plurality of cantilevered fingers extending from the collar, the housing insert further including a first shoulder and a second shoulder with an opening formed between the first and second shoulders, and wherein the plurality of cantilevered fingers extends through the opening between the first and second shoulders and toward the front end of the housing insert.

10. The electrical connector of claim 9, the housing insert further including a pocket formed within the contact-receiving cavity between the first and second shoulders and a first wall and a second wall, the electrical connector further including a contact-retaining clip encircling the socket contact, wherein the contact-retaining clip is seated within the pocket to retain the socket contact within the housing insert.

11. The electrical connector of claim 10, further comprising a napkin ring encircling the plurality of cantilevered fingers, the napkin ring applying a spring force onto the cantilevered fingers.

12. An electrical connector system comprising:

a pin connector including:

an electrically conductive shell including a body, the body having a front end and an opposite rear end, and a cavity extending along an axial direction through the body from the front end to the rear end;

an electrically insulating housing insert including a body, the body having a front end and an opposite rear end and a contact-receiving cavity extending along an axial direction through the body from the front end to the rear end, the housing insert disposed within the cavity of the electrically conductive shell;

a wire-terminating pin contact housed within the contact-receiving cavity of the housing insert, the pin contact including a head extending toward the front end of the housing insert, wherein a wire terminated by the pin contact extends through the contact-receiving cavity and out the rear end of the housing insert; and a wire sealing grommet including a body, the body having a front end and an opposite rear end, and a cavity extending along an axial direction through the body from the front end to the rear end, the wire sealing grommet including a plurality of ripple features formed within the cavity thereof, wherein the front end of the wire sealing grommet is coupled to the rear end of the housing insert, the wire terminated by the pin contact extending through the cavity where the plurality of ripple features form a seal around the wire; and a socket connector including:

an electrically conductive shell including a body, the body having a front end and an opposite rear end, and a cavity extending along an axial direction through the body from the front end to the rear end;

an electrically insulating housing insert including a body, the body having a front end and an opposite rear end and a contact-receiving cavity extending along an axial direction through the body from the front end to the rear end, the housing insert disposed within the cavity of the electrically conductive shell;

a wire-terminating socket contact housed within the contact-receiving cavity of the housing insert, the socket contact having a plurality of cantilevered fingers extending toward the front end of the housing insert, wherein a wire terminated by the socket contact extends through the contact-receiving cavity and out the rear end of the housing insert; and a wire sealing grommet including a body, the body having a front end and an opposite rear end, and a cavity extending along an axial direction through the body from the front end to the rear end, the wire sealing grommet including a plurality of ripple features formed within the cavity thereof, wherein the front end of the wire sealing grommet is coupled to the rear end of the housing insert, the wire terminated by the socket contact extending through the cavity where the plurality of ripple features form a seal around the wire, wherein the pin contact extends into and is received between the plurality of cantilevered fingers when the pin connector and socket connector are in a mated configuration.

13. The electrical connector system of claim 12, wherein for each of the pin connector and the socket connector, the body of the shell includes a first key feature formed thereon, and the body of the housing insert includes a second key feature formed thereon, the first and second key features engaging one another to resist independent rotation of the housing insert relative to the shell.

14. The electrical connector system of claim 12, wherein for each of the pin connector and the socket connector, the housing insert further includes a channel formed along an exterior surface thereof, the electrical connector further comprising a retaining ring positioned within the channel, the retaining ring resisting separation of the housing insert from the shell.

15. The electrical connector system of claim 14, further comprising for each of the pin connector and the socket connector, a spring encircling the housing insert, the spring abutting against an interior surface of the shell and applying a spring force against the housing insert to drive the retaining ring into the channel and maintain the housing insert and shell in a locked configuration.

16. The electrical connector system of claim 12, wherein for each of the pin connector and the socket connector, the shell further including a first lip formed on the body adjacent the rear end and a second lip formed on the body and offset from the first lip, the body including a seat formed between the first and second lips, the electrical connector further comprising a shield extending over the wire sealing grommet and onto the seat on the shell.

17. The electrical connector system of claim 16, further comprising for each of the pin connector and the socket connector, a shield banding strap encircling the shield and the seat on the shell.

18. The electrical connector system of claim 12, wherein the housing insert for the pin connector further includes a first shoulder and a second shoulder with an opening formed between the first and second shoulders, and wherein the head of the pin contact extends through the opening between the first and second shoulders, and wherein the housing insert for the socket connector further includes a first shoulder and a second shoulder with an opening formed between the first and second shoulders, and wherein the plurality of cantilevered fingers of the socket contact extends through the opening between the first and second shoulders.

19. The electrical connector system of claim 18, wherein for each of the pin connector and the socket connector, the housing insert further including a pocket formed within the contact-receiving cavity between the first and second shoulders and a first wall and a second wall, the electrical connector system further comprising:

a first contact-retaining clip encircling the pin contact, wherein the first contact-retaining clip is seated within the pocket of the housing insert of the pin connector to retain the pin contact within the housing insert; and a second contact-retaining clip encircling the socket contact, wherein the second contact-retaining clip is seated within the pocket of the housing insert of the socket connector to retain the socket contact within the housing insert.

20. The electrical connector system of claim 12, further comprising a napkin ring encircling the plurality of cantilevered fingers of the socket connector, the napkin ring applying a spring force onto the cantilevered fingers to urge the cantilevered fingers against the head of the pin contact when the pin connector and the socket connector are in a mated configuration.

* * * * *